US012314853B2

(12) United States Patent
Douillard et al.

(10) Patent No.: US 12,314,853 B2
(45) Date of Patent: May 27, 2025

(54) TRAINING AGENT TRAJECTORY PREDICTION NEURAL NETWORKS USING DISTILLATION

(71) Applicant: Waymo LLC, Mountain View, CA (US)

(72) Inventors: Bertrand Robert Douillard, San Francisco, CA (US); Dijia Su, Jersey City, NJ (US)

(73) Assignee: Waymo LLC, Mountain View, CA (US)

( * ) Notice: Subject to any disclaimer, the term of this patent is extended or adjusted under 35 U.S.C. 154(b) by 441 days.

(21) Appl. No.: 17/947,052

(22) Filed: Sep. 16, 2022

(65) Prior Publication Data

US 2023/0082079 A1 Mar. 16, 2023

Related U.S. Application Data

(60) Provisional application No. 63/248,950, filed on Sep. 27, 2021, provisional application No. 63/245,173, filed on Sep. 16, 2021.

(51) Int. Cl.
*G06K 9/62* (2022.01)
*G06N 3/08* (2023.01)
*G06T 7/20* (2017.01)

(52) U.S. Cl.
CPC .............. *G06N 3/08* (2013.01); *G06T 7/20* (2013.01); *G06T 2207/20081* (2013.01); *G06T 2207/20084* (2013.01); *G06T 2207/30241* (2013.01)

(58) Field of Classification Search
CPC ........ G06N 3/08; G06N 3/006; G06N 3/0442; G06N 3/0455; G06N 3/0464; G06T 7/20; G06T 2207/20081; G06T 2207/20084; G06T 2207/30241; G06T 2207/30236; G06T 2207/30252
See application file for complete search history.

(56) References Cited

U.S. PATENT DOCUMENTS

| 2019/0033085 A1* | 1/2019 | Ogale | ............... G01C 21/3446 |
| 2019/0034794 A1* | 1/2019 | Ogale | ................. G05D 1/0212 |
| 2020/0174490 A1* | 6/2020 | Ogale | .................... G06N 3/045 |
| 2021/0001897 A1* | 1/2021 | Chai | ...................... G06T 7/277 |

OTHER PUBLICATIONS

[No Author Listed]., "Narrowing the coordinate-frame gap in behavior prediction models: Distillation for efficient and accurate scene-centric motion forecasting," Presented at Proceedings of ICRA 2022, Philadelphia, PA, USA, May 23-27, 2022, 19 pages.
Alahi et al., "Social LSTM: Human Trajectory Prediction in Crowded Spaces," Proceedings of the IEEE Conference on Computer Vision and Pattern Recognition (CVPR), Jun. 2016, 961-971.
Bansal et al., "Chauffeurnet: Learning to drive by imitating the best and synthesizing the worst," csRO, Submitted on Dec. 7, 2018, arXiv:1812.03079, 20 pages.

(Continued)

*Primary Examiner* — Xin Jia
(74) *Attorney, Agent, or Firm* — Fish & Richardson P.C.

(57) ABSTRACT

Methods, systems, and apparatus, including computer programs encoded on computer storage media, for training trajectory prediction neural networks using distillation.

20 Claims, 3 Drawing Sheets

(56) References Cited

OTHER PUBLICATIONS

Buhet et al. "Plop: Probabilistic polynomial objects trajectory planning for autonomous driving," csCV, Submitted on Mar. 9, 2020, arXiv.2003.08744, 20 pages.

Caesar et al., "nuscenes: A multimodal dataset for autonomous driving," Proceedings of the IEEE/CVF Conference on Computer Vision and Pattern Recognition (CVPR), Jun. 2020, 11621-11631.

Casas et al., "Intentnet: Learning to predict intention from raw sensor data," Proceedings of the 2nd Conference on Robot Learning, PMLR, Oct. 2018, 87:947-956.

Casas et al., "Spagnn: Spatially-aware graph neural networks for relational behavior forecasting from sensor data," csCV, Submitted on Oct. 18, 2019, arXiv:1910.08233, 11 pages.

Chai et al, "Multipath: Multiple probabilistic anchor trajectory hypotheses for behavior prediction," csLG, Submitted on Oct. 12, 2019, arXiv:1910.05449, 1-14.

Chang et al., "Argoverse: 3d tracking and forecasting with rich maps," Proceedings of the IEEE/CVF Conference on Computer Vision and Pattern Recognition (CVPR), Jun. 2019, 8748-8757.

Cheng et al, "Explaining knowledge distillation by quantifying the knowledge," Proceedings of the IEEE/CVF Conference on Computer Vision and Pattern Recognition (CVPR), Jun. 2020, 12925-12935.

Ettinger et al., "Large scale interactive motion forecasting for autonomous driving: The waymo open motion dataset," Proceedings of the IEEE/CVF Conference on Computer Vision and Pattern Recognition (CVPR), Jun. 2021, 9710-9719.

Gao et al, "Vectornet: Encoding hd maps and agent dynamics from vectorized representation," Proceedings of the IEEE/CVF Conference on Computer Vision and Pattern Recognition (CVPR), Jun. 2020, 11525-11533.

Gupta et al, "Social GAN: Socially acceptable trajectories with generative adversarial networks," Proceeding of the IEEE Conference on Computer Vision and Pattern Recognition (CVPR), Jun. 2018, 2255-2264.

Hinton et al., "Distilling the knowledge in a neural network," statML, Submitted on Mar. 9, 2015, arXiv:1503.02531, 9 pages.

Hong et al, "Rules of the road: Predicting driving behavior with a convolutional model of semantic interactions," Proceedings of the IEEE/CVF Conference on Computer Vision and Pattern Recognition (CVPR), Jun. 2019, 8454-8462.

Khandelwal et al, "What-if motion prediction for autonomous driving," csLG, Submitted on Aug. 24, 2020, arXiv:2008.10587, 16 pages.

Kim et al., "Sequence-level knowledge distillation," csCL, Submitted on Jun. 25, 2016, arXiv:1606.07947, 2016, 11 pages.

Lang et al, "Pointpillars: Fast encoders for object detection from point clouds," Proceedings of the IEEE/CVF Conference on Computer Vision and Pattern Recognition (CVPR), Jun. 2019, 12697-12705.

Lee et al., "Desire: Distant future prediction in dynamic scenes with interacting agents," Proceedings of the IEEE Conference on Computer Vision and Pattern Recognition (CVPR), Jul. 2017, 336-345.

Liang et al., "Learning lane graph representations for motion forecasting," csCV Submitted on Jul. 27, 2020, arXiv:2007.13732, 18 pages.

Liu et al., "Multimodal motion prediction with stacked transformers," Proceedings of the IEEE/CVF Conference on Computer Vision and Pattern Recognition (CVPR), Jun. 2021, 7577-7586.

Mercat et al., "Multi-head attention for joint multi-modal vehicle motion forecasting," 2020 IEEE International Conference on Robotics and Automation (ICRA), HAL open science, May 2020, 8 pages.

Mercat et al., "Multi-head attention for multi-modal joint vehicle motion forecasting," csLG, Submitted on Oct. 8, 2019, arXiv:1910.03650, 7 pages.

Ngiam et al., "Scene transformer: A unified multi-task model for behavior prediction and planning," csCV, Submitte Jun. 15, 2021, arXiv:2106.08417, 21 pages.

Phan-Minh et al, "Covernet: Multimodal behavior prediction using trajectory sets," Proceedings of the IEEE/CVF Conference on Computer Vision and Pattern Recognition (CVPR), Jun. 2020, 14074-14083.

Phuong et al., "Towards understanding knowledge distillation," Proceedings of the 36th International Conference on Machine Learning, PMLR, Jun. 2019, 97:5142-5151.

Rhinehart et al., "PRECOG: Prediction conditioned on goals in visual multi-agent settings," Proceedings of the IEEE/CVF International Conference on Computer Vision (ICCV), Jun. 2019, 2821-2830.

Rhinehart et al., "R2p2: A reparameterized pushforward policy for diverse, precise generative path forecasting," Proceedings of the European Conference on Computer Vision (ECCV), Jun. 2018, 772-788.

Salzmann et al., "Trajectron++: Dynamically-feasible trajectory forecasting with heterogeneous data," Proceeding of the European Conference on Computer vision (ECCV), Dec. 4, 2020, 683-700.

Salzmann et al., "Trajectron++: Multi-agent generative trajectory forecasting with heterogeneous data for control," csRO, Submitted on Jan. 9, 2020, arXiv:2001.03093, 13 pages.

Su et al., "Narrowing the coordinate-frame gap in behavior prediction models: Distillation for efficient and accurate scene-centric motion forecasting," 2022 International Conference on Robotics and Automation (ICRA), May 2022, 653-659.

Tan et al, "Efficientnet: Rethinking model scaling for convolutional neural networks," Proceedings of the 36th International Conference on Machine Learning. PMLR, Jun. 2019, 97:6105-6114.

Tang et al, "Multiple futures prediction," Advances in Neural Information Processing Systems, Dec. 8-14, 2019, vol. 32, 11 pages.

Ye et al., "Tpcn: Temporal point cloud networks for motion forecasting," Proceedings of the IEEE/CVF Conference on Computer Vision and Pattern Recognition (CVPR), Jun. 2021, 11318-11327.

Yuan et al., "Diverse trajectory forecasting with determinantal point processes," csCV, Submitted on Jul. 11, 2019, arXiv:1907.04967, 15 pages.

Zeng et al., "Lanercnn: Distributed representations for graph-centric motion forecasting," csCV, Submitted on Jan. 17, 2021, arXiv2101.06653, 14 pages.

Zhan et al., "Interaction dataset: An international, adversarial and cooperative motion dataset in interactive driving scenarios with semantic maps," csRO, Submitted on Sep. 30, 2019, arXiv:1910.03088, 13 pages.

Zhao et al, "Multi-agent tensor fusion for contextual trajectory prediction," Proceedings of the IEEE/CVF Conference on Computer Vision and Pattern Recognition (CVPR), Jun. 2019, 12126-12134.

Zhao et al., "Tnt: Target-driven trajectory prediction," csCV, Submitted on Aug. 19, 2020, arXiv:2008.08294, 12 pages.

Zhou et al, "Understanding knowledge distillation in non-autoregressive machine translation," csCL, Submitted on Nov. 7, 2019, arXiv:1911.02727, 14 pages.

* cited by examiner

TRAINING AGENT TRAJECTORY PREDICTION NEURAL NETWORKS USING DISTILLATION

CROSS-REFERENCE TO RELATED APPLICATIONS

This application claims priority to U.S. Provisional Application No. 63/245,173, filed on Sep. 16, 2021, and U.S. Provisional Application No. 63/248,950, filed on Sep. 27, 2021. The disclosures of the prior applications are considered part of and are incorporated by reference in the disclosure of this application.

BACKGROUND

This specification relates to predicting the future trajectory of an agent in an environment.

The environment may be a real-world environment, and the agent may be, e.g., a vehicle, cyclist, pedestrian, or other vehicle in the environment. Predicting the future trajectories of agents is a task required for motion planning, e.g., by an autonomous vehicle.

Autonomous vehicles include self-driving cars, boats, and aircraft. Autonomous vehicles use a variety of on-board sensors and computer systems to detect nearby objects and use such detections to make control and navigation decisions.

SUMMARY

This specification describes a system implemented as computer programs on one or more computers in one or more locations that trains a neural network that generates trajectory predictions for one or more target agents, e.g., a vehicle, a cyclist, or a pedestrian, in an environment. Each trajectory prediction is a prediction that defines the future trajectory of the corresponding target agent starting from a current time point.

The subject matter described in this specification can be implemented in particular embodiments so as to realize one or more of the following advantages.

Predicting the future behavior of road users is a challenging and important problem for autonomous driving and control of other types of autonomous vehicles. Moreover, when trajectory predictions need to be generated on-board the vehicle, there are strict latency requirements for generating the trajectory predictions so that they can be used to make timely control decisions for the autonomous vehicle.

To deal with these issues, this specification describes training a scene-centric trajectory prediction neural network using an already trained agent-centric trajectory prediction neural network. This can allow the trained scene-centric trajectory prediction neural network to achieve performance that matches or exceeds that of the agent-centric trajectory prediction neural network while being much more computationally efficient and generating predictions with reduced latency.

This is because, for agent-centric neural networks, the computational cost required to make a prediction for all agents in a scene can potentially scale quadratically with the number of agents and scene elements in the scene, while for scene-centric networks the computational cost scales at most linearly with the number of agents in the scene. In particular, the agent-centric networks require a respective agent-centric input for each agent in the scene while scene-centric networks require only a single input that is shared between all agents in the scene.

This training can therefore remove the computational bottleneck associated with deploying agent-centric networks on-board autonomous vehicles, i.e., by instead deploying a scene-centric network trained using the described techniques, without sacrificing performance quality. That is, the described techniques allow an on-board trajectory prediction model to make predictions within the latency requirements of the autonomous vehicle but with accuracy that matches or exceeds that of agent-centric models that cannot be deployed on the vehicle within the latency budget.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes training a trajectory prediction neural network to accurately and reliably make predictions.

More specifically, this specification describes training a scene-centric trajectory prediction neural network using an already trained agent-centric trajectory prediction neural network.

More generally, however, the described techniques can be used to "distill" between any two trajectory prediction neural networks, i.e., to distill knowledge from any type of trained trajectory prediction network to another trajectory prediction network of any type. For example, using the described techniques, a scene-centric trajectory prediction neural network can be trained using an already trained scene-centric trajectory prediction neural network, e.g., to distill knowledge from a larger model to a more computationally efficient model. As another example, using the described techniques, a smaller agent-centric trajectory prediction neural network can be trained using an already trained but larger and less computationally-efficient scene-centric trajectory prediction neural network. As yet another example, using the described techniques, a smaller agent-centric trajectory prediction neural network can be trained using an already trained but larger and less computationally-efficient agent-centric trajectory prediction neural network.

Figure 1:
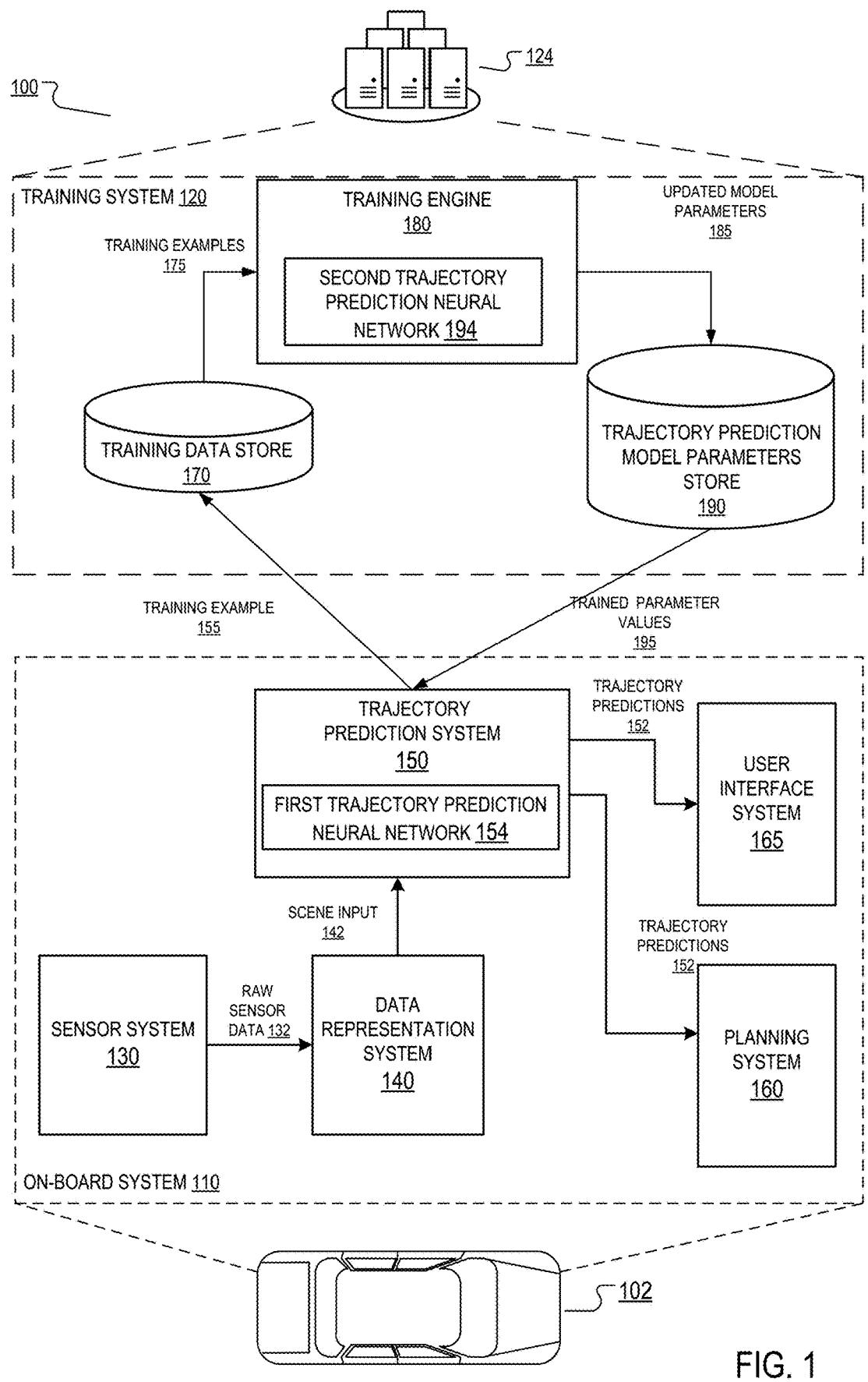
FIG. 1 is a diagram of an example system.

FIG. 1 is a diagram of an example system 100. The system 100 includes an on-board system 110 and a training system 120.

The on-board system 110 is located on-board a vehicle 102. The vehicle 102 in FIG. 1 is illustrated as an automobile, but the on-board system 102 can be located on-board any appropriate vehicle type.

In some cases, the vehicle 102 is an autonomous vehicle. An autonomous vehicle can be a fully autonomous vehicle that determines and executes fully-autonomous driving decisions in order to navigate through an environment. An autonomous vehicle can also be a semi-autonomous vehicle that uses predictions to aid a human driver. For example, the vehicle 102 can autonomously apply the brakes if a prediction indicates that a human driver is about to collide with another vehicle. As another example, the vehicle 102 can have an advanced driver assistance system (ADAS) that assists a human driver of the vehicle 102 in driving the vehicle 102 by detecting potentially unsafe situations and alerting the human driver or otherwise responding to the unsafe situation. As a particular example, the vehicle 120 can alert the driver of the vehicle 102 or take an autonomous driving action when an obstacle is detected, when the vehicle departs from a driving lane, or when an object is detected in a blind spot of the human driver.

The on-board system 110 includes one or more sensor subsystems 130. The sensor subsystems 130 include a combination of components that receive reflections of electromagnetic radiation, e.g., lidar systems that detect reflections of laser light, radar systems that detect reflections of radio waves, and camera systems that detect reflections of visible light.

The sensor data generated by a given sensor generally indicates a distance, a direction, and an intensity of reflected radiation. For example, a sensor can transmit one or more pulses of electromagnetic radiation in a particular direction and can measure the intensity of any reflections as well as the time that the reflection was received. A distance can be computed by determining how long it took between a pulse and its corresponding reflection. The sensor can continually sweep a particular space in angle, azimuth, or both. Sweeping in azimuth, for example, can allow a sensor to detect multiple objects along the same line of sight.

The sensor subsystems 130 or other components of the vehicle 102 can also classify groups of one or more raw sensor measurements from one or more sensors as being measures of another agent. A group of sensor measurements can be represented in any of a variety of ways, depending on the kinds of sensor measurements that are being captured. For example, each group of raw laser sensor measurements can be represented as a three-dimensional point cloud, with each point having an intensity and a position in a particular two-dimensional or three-dimensional coordinate space. In some implementations, the position is represented as a range and elevation pair. Each group of camera sensor measurements can be represented as an image patch, e.g., an RGB image patch.

Once the sensor subsystems 130 classify one or more groups of raw sensor measurements as being measures of respective other agents, the sensor subsystems 130 can compile the raw sensor measurements into a set of raw data 132, and send the raw data 132 to a data representation system 140.

The data representation system 140, also on-board the vehicle 102, receives the raw sensor data 132 from the sensor system 130 and generates scene data 142. The scene data 142 characterizes the current state of the environment surrounding the vehicle 102 as of the current time point and will also be referred to below as "context data."

For example, the scene data can characterize, for all surrounding agents in the environment, a current state at the current time point and a previous state at one or more respective previous time points. In other words, the scene data can include, for all surrounding agents in the environment, data that characterizes a previous trajectory of the agent in the environment up to the current time point. The state of an agent at a time point can include the location of the agent at the time point and, optionally, values for a predetermined set of motion parameters at the time point. As a particular example, the motion parameters can include a heading for the agent, a velocity of the agent, and/or an acceleration of the agent.

The scene data also includes data characterizing a current state of the vehicle at the current time point and a previous state of the vehicle at one or more respective previous time points.

In some implementations, the scene data also includes data characterizing features of the environment that are obtained from map information characterizing the environment. These features can include (i) dynamic features of the environment, e.g., traffic light states at the current time point, (ii) static features of the environment, e.g., road graph data characterizing one or more of lane connectivity, lane type, stop lines, speed limits, and so on, or (iii) both.

The data representation system 140 provides the scene data 142 to a trajectory prediction system 150, also on-board the vehicle 102.

The trajectory prediction system 150 processes the scene data 142 to generate a respective trajectory prediction output 152 for each of one or more of the surrounding agents. The trajectory prediction output 152 for a given agent characterizes the future trajectory of the agent after the current time point.

More specifically, the trajectory prediction output 152 for a given agent represents a likelihood distribution over possible future trajectories that can be followed by the agent, e.g., a probability distribution or another distribution that specifies a respective likelihood score for each of a set of possible future trajectories.

Each possible future trajectory includes data specifying a sequence of multiple waypoint spatial locations in the environment that each correspond to a possible position of the agent at a respective future time point that is after the future time point.

As a particular example, the trajectory prediction output 152 can include data defining a plurality of possible future trajectories and a respective likelihood score for each of the plurality of possible future trajectories that represents the likelihood that the possible future trajectory will be closest to the actual trajectory followed by the surrounding agent.

The data defining the future trajectories can be, for each future trajectory, a fixed set of waypoint locations that make up the trajectory.

Alternatively, the data defining the future trajectory can be parameters of a probability distribution around the first possible future trajectory. That is, the data can be parameters of a respective parametric probability distribution for each waypoint spatial location in the possible future trajectory, i.e., a respective distribution over spatial locations for each time point in the trajectory. As a particular example, the parametric probability distribution for a given waypoint spatial location can be a Normal probability distribution over spatial locations and the data defining the parameters of the Normal probability distribution can include (i) a mean of the Normal probability distribution, and (ii) covariance parameters of the Normal probability distribution.

Generally, the trajectory prediction system 150 generates the trajectory prediction outputs using a first trajectory prediction neural network 154 (also referred to as a "student neural network" or a "student model").

The first trajectory prediction neural network 154 is a trajectory prediction neural network that can make trajectory predictions within the latency requirements of deployment on-board the vehicle 112.

As a particular example, the first trajectory prediction neural network 154 can be a scene-centric trajectory prediction neural network (also referred as a "scene-centric model" or a "scene-centric neural network").

A scene-centric trajectory prediction neural network is a trajectory prediction neural network that has trajectory prediction model parameters (also referred to as "scene-centric parameters") and that is configured to receive a scene input that includes features of a scene in an environment that includes a plurality of agents and to process the features in accordance with the scene-centric parameters to generate as output a respective trajectory prediction for each of the plurality of agents. That is, the scene-centric trajectory prediction neural network can generate a respective prediction for each agent in parallel because the scene input characterizes the scene in a shared coordinate system, rather than requiring a separate input for each of the plurality of agents that characterizes the scene in an agent-centric coordinate system.

The scene-centric trajectory prediction neural network will be described in more detail below with reference to FIGS. 2 and 3.

The on-board system 110 also includes a planning system 160. The planning system 160 can make autonomous or semi-autonomous driving decisions for the vehicle 102, e.g., by generating a planned vehicle path that characterizes a path that the vehicle 102 will take in the future.

The on-board system 100 can provide the trajectory prediction outputs 152 generated by the trajectory prediction system 150 to one or more other on-board systems of the vehicle 102, e.g., the planning system 160 and/or a user interface system 165.

When the planning system 160 receives the trajectory prediction outputs 152, the planning system 160 can use the trajectory prediction outputs 152 to generate planning decisions that plan a future trajectory of the vehicle, i.e., to generate a new planned vehicle path. For example, the trajectory prediction outputs 152 may contain a prediction that a particular surrounding agent is likely to cut in front of the vehicle 102 at a particular future time point, potentially causing a collision. In this example, the planning system 160 can generate a new planned vehicle path that avoids the potential collision and cause the vehicle 102 to follow the new planned path, e.g., by autonomously controlling the steering of the vehicle, and avoid the potential collision.

When the user interface system 165 receives the trajectory prediction outputs 152, the user interface system 165 can use the trajectory prediction outputs 152 to present information to the driver of the vehicle 102 to assist the driver in operating the vehicle 102 safely. The user interface system 165 can present information to the driver of the agent 102 by any appropriate means, for example, by an audio message transmitted through a speaker system of the vehicle 102 or by alerts displayed on a visual display system in the agent (e.g., an LCD display on the dashboard of the vehicle 102). In a particular example, the trajectory prediction outputs 152 may contain a prediction that a particular surrounding agent is likely to cut in front of the vehicle 102, potentially causing a collision. In this example, the user interface system 165 can present an alert message to the driver of the vehicle 102 with instructions to adjust the trajectory of the vehicle 102 to avoid a collision or notifying the driver of the vehicle 102 that a collision with the particular surrounding agent is likely.

To generate the trajectory prediction outputs 152, the trajectory prediction system 150 can use trained parameter values 195, i.e., trained model parameter values of the trajectory prediction neural network 154, obtained from a trajectory prediction model parameters store 190 in the training system 120.

The training system 120 is typically hosted within a data center 124, which can be a distributed computing system having hundreds or thousands of computers in one or more locations.

The training system 120 includes a training data store 170 that stores the training data used to train the trajectory prediction system i.e., to determine the trained parameter values 195 of the trajectory prediction system 150. The training data store 170 receives raw training examples from, e.g., agents operating in the real world, from computer simulations of the real-world, or one or more computer programs that generate synthetic navigation scenarios by modifying real-world data.

For example, the training data store 170 can receive a raw training example 155 from the vehicle 102 and one or more other agents that are in communication with the training system 120. The raw training example 155 can be processed by the training system 120 to generate a new training example 175.

The new training example 175 can include scene data, i.e., like the scene data 142, that can be used as input for a new training example.

The raw training example 155 can also include outcome data characterizing the state of the environment surrounding the vehicle 102 at the one or more future time points. This outcome data can be used to generate, as part of the new training example 175, ground truth trajectories for one or more agents in the vicinity of the vehicle at the time point characterized by the scene data. Each ground truth trajectory identifies the actual trajectory (as derived from the outcome data) traversed by the corresponding agent at the future time points. For example, the ground truth trajectory can identify spatial locations in an agent-centric coordinate system to which the agent moved at each of multiple future time points.

The training data store 170 provides training examples 175 to a training engine 180, also hosted in the training system 120. The training engine 180 uses the training examples 175 to train the first trajectory prediction neural network 154, i.e., to update model parameters that will be used by the trajectory prediction system 150, and provides the updated model parameters 185 to the trajectory prediction model parameters store 190. Once the parameter values of the trajectory prediction system 150 have been fully trained, the training system 120 can send the trained parameter values 195 to the trajectory prediction system 150, e.g., through a wired or wireless connection.

More specifically, the training engine 180 trains the first trajectory prediction neural network 154 using an already-trained second trajectory prediction neural network 194 (also referred to as a "teacher model" or a "teacher neural network").

For example, the training engine 180 or a different training system can have trained the second trajectory prediction neural network 194 on the training examples 175 in the training data store 170 or on a different set of training data that each include (i) scene data and (ii) a corresponding ground truth trajectory as described above. One example of a loss function that can be used to train the second trajectory prediction neural network 194 is described below with reference to FIG. 2.

Generally, the training engine 180 trains the first trajectory prediction neural network 154 through "distillation,"

i.e., by comparing predictions generated by the student neural network to predictions generated by the teacher neural network.

As a particular example, the second trajectory prediction neural network 194 can be an agent-centric trajectory prediction neural network (also referred to as an "agent-centric model" or an "agent-centric network").

An agent-centric trajectory prediction neural network is configured to generate predictions for agents in the scene by, for each agent, generating, from the scene data, a corresponding agent-centric input that is in an agent-centric coordinate system and then processing the agent-centric input to generate a trajectory prediction output for the agent. That is, the agent-centric trajectory prediction neural network independently generates a trajectory prediction for each agent of interest in a scene.

Because processing the scene data to generate multiple different inputs and processing each of the multiple inputs independently through the neural network can be computationally expensive and incur significant latency, the agent-centric trajectory prediction neural network may be too computationally expensive to run on-board the vehicle 112. However, the training engine 180 can "distill" the knowledge of the agent-centric neural network into the scene-centric neural network before the scene-centric neural network is deployed on-board the vehicle 112. That is, by leveraging the outputs generated by the second trajectory prediction neural network 194 after the second trajectory prediction neural network 194 has been trained, the training engine 180 can train the first trajectory prediction neural network 154 to have performance that matches or exceeds that of the second trajectory prediction neural network 194 even though the first trajectory prediction neural network 154 can generate predictions with low latency when deployed on-board the vehicle 112 while the second trajectory prediction neural network 194 cannot.

Training the first trajectory prediction neural network 154 is described in more detail below with reference to FIGS. 2 and 3.

Figure 2:
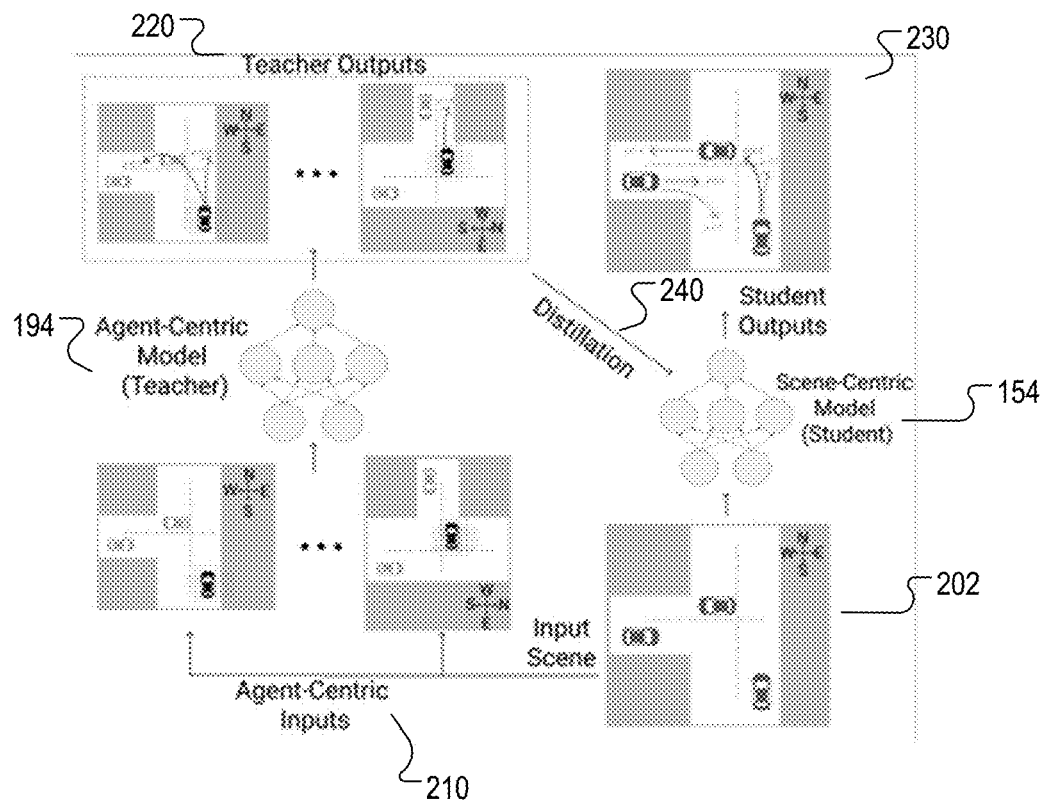
FIG. 2 shows the training of the student trajectory prediction neural network.

FIG. 2 shows an example of the training of the first trajectory prediction neural network 154 when the neural network 154 is a scene-centric neural network (referred to as a scene-centric model in the Figure).

In the example, of FIG. 2, the student-centric model is trained using an already-trained agent-centric neural network 194 (referred to as an agent-centric model in the Figure).

More specifically, FIG. 2 shows an example of the training of the student-centric model on a training example 202 that depicts an input scene that includes three agents navigating through the environment.

In order to generate respective trajectory predictions for each of the three agents using the agent-centric model, the system needs to generate a respective agent-centric input 210 for each of the three agents. The agent-centric input for a given agent includes features that characterize the scene and that are represented in an agent-specific coordinate frame that is specific to the given agent.

The system then processes each agent-centric input 210 using the trained agent-centric model 194 to generate a respective trajectory prediction 220 for each of the agents. That is, the system independently processes each of the agent-centric inputs using the trained agent-centric model.

To generate the trajectory predictions using the scene-centric model, on the other hand, the system processes a single scene input characterizing the scene in a shared coordinate system using the scene-centric model and the model, generates, in parallel respective trajectory predictions 230 for each of the three agents.

As a result, the scene-centric model can generate the predictions for all of the three agents with significantly reduced latency relative to the agent-centric model, i.e., when deployed on the same hardware.

The scene-centric and agent-centric models generate trajectory predictions that, for a given agent, include the same type of information.

In particular, any given trajectory prediction for a given agent can include a respective likelihood for each of a set of K possible trajectories and parameters of a probability distribution that defines each of the possible trajectories, i.e., parameters of a probability distribution around the possible trajectory. A possible trajectory generated by the scene-centric neural network will be referred to as a "first" possible trajectory and a possible trajectory generated by the agent-centric neural network will be referred to as a "second" possible trajectory.

More specifically, the trajectory prediction output can include K probabilities or other similarity scores, one for each of K possible trajectories. If each possible trajectory includes T future time points, the trajectory prediction output also includes, for each of the K possible trajectories and at each of the T future time points, data characterizing a probability distribution. Thus, if the data characterizing a probability distribution includes D values, then the trajectory prediction output for a given agent includes K+K×T×D values.

In particular, for any given future time point within a given possible future trajectory, the data characterizing the probability distribution includes data defining parameters of a parametric probability distribution over waypoint spatial locations.

As a particular example, the parametric probability distribution dependent on the waypoint spatial location can be a Normal probability distribution and the data defining the parameters of the Normal probability distribution can include (i) a mean of the Normal probability distribution, and (ii) covariance parameters of the Normal probability distribution. For example, the covariance parameters can define a 2×2 covariance matrix. In this example, the trajectory prediction output includes a respective similarity score for each possible trajectory, and for each future time point in each possible trajectory, the trajectory prediction output can include five values: the mean along the x dimension, the mean along the y dimension, and three parameters that define the covariance matrix. Thus, the trajectory prediction output would include the K similarity scores and K×T×5 values that define the probability distributions at the future time points within the K possible trajectories.

As another particular example, the covariance can be fixed, and the data defining the parameters of the Normal distribution at a given future time point can only include the mean parameters for the given future time point.

The agent-centric neural network can have any appropriate architecture that allows the neural network to map an agent-centric input for an agent into a trajectory prediction for that agent.

As a particular example, the agent-centric neural network can map the agent-centric input to an embedding for the agent and then process the embedding for the agent using a decoder to generate the trajectory prediction. The decoder can be, e.g., a multi-layer perceptron (MLP), a Transformer, or a recurrent neural network (RNN).

The neural network can use any of a variety of encoder neural networks to map the agent-centric input to an embedding.

As a particular example, the encoder can receive road graph and traffic light information, motion history (i.e., agents states history), and agents interactions. For the road graph information, the encoder can use polylines to encode the road elements from a 3D high definition map with an MLP. For traffic light information, the encoder can use a recurrent neural network, e.g., an LSTM, to encode the traffic light information. For the motion history, the encoder can use a recurrent neural network to handle a sequence of past observations, and the last iteration of the hidden state is used as the history embedding. For agent interactions, the encoder can use a recurrent neural network to encode the neighbors' motion history in an agent centric frame, and aggregate all neighbors' information via max-pooling to arrive to a single interaction embedding. Finally, these four encodings are concatenated together to create an embedding for the agent in the agent-centric coordinate frame.

Like the agent-centric neural network, the scene-centric neural network can have any appropriate architecture that allows the neural network to map a shared scene-centric input into a trajectory prediction for each of multiple agents.

As a particular example, the scene-centric neural network can map the scene-centric input to a feature map of the scene and then, for each agent, crop the portion of the feature map that corresponds to the agent's location to generate an embedding for the agent. The system can then process, e.g., in parallel, the embeddings for each agent using a decoder to generate the trajectory prediction. The decoder can be, e.g., a multi-layer perceptron (MLP), a Transformer, or a recurrent neural network (RNN).

The neural network can use any of a variety of encoder neural networks to map the scene-centric input to a feature map.

As a particular example, the encoder can consume road information represented as points augmented with semantic attributes, agents information in the form of points sampled from each agent's oriented box, and traffic light information, also represented as points augmented with semantic attributes. The encoder can encode all these input points with a PointPillars encoder followed by a 2D convolutional backbone to generate the feature map.

The system can then train the scene-centric neural network on a distillation loss function 240 that measures a difference between the student outputs (the trajectory predictions generated by the scene-centric model) and the teacher outputs (the trajectory predictions generated by the agent-centric model).

Generally, the distillation loss function includes one or more terms that measure, for a given one of the plurality of agents in the scene characterized by the training example, a difference between (i) the teacher output for the agent, i.e., the second trajectory prediction generated for the agent by the trained agent-centric trajectory prediction neural network and (ii) the student output for the agent, i.e., the first trajectory prediction generated for the agent by the scene-centric trajectory prediction neural network.

In some implementations, each training example also includes a respective ground truth observed trajectory for one or more of the plurality of agents in the scene characterized by the training example. In these cases, the distillation loss function can also include an additional term that measures, for each of the one or more agents for which a respective ground truth observed trajectory is included in the training example, a difference between (i) the respective ground truth observed trajectory for the agent and (ii) the trajectory prediction generated for the agent by the scene-centric trajectory prediction neural network.

For example, this additional term can maximize the log likelihood assigned to the ground truth observed trajectory for the agent by the trajectory prediction generated for the agent. As a particular example, when the trajectory prediction outputs include a respective likelihood for each of a set of K possible trajectories and parameters of a probability distribution that defines each of the possible trajectories as described above, the additional term can satisfy:

$$\Sigma_{k=1}^{K} 1(k=\hat{k}^m)[\log \pi(x^m;\theta) + \Sigma_{t=1}^{T} \log N(s_t^k | \mu_t^k, \Sigma_t^k; x^m; \theta)],$$

where K is the total number of possible trajectories, θ are the model parameters of the scene-centric neural network, $1(k=\hat{k}^m)$ is an indicator function that is 1 when the index k is the same as the index km of the most similar anchor trajectory to the ground truth trajectory and 0 whenever the index k is not the same as the index $\hat{k}^m$, $\pi(x^m; \theta)$ is the probability assigned to possible trajectory k in the trajectory prediction output given the scene data $x^m$, T is the total number of time points in the possible trajectories, $N(s_t^k | \mu_t^k, s_t^k; x^m; \theta)$ is the probability assigned to waypoint spatial location $s_t^k$ at time t in the ground truth trajectory by a Normal distribution having a mean that is $\mu_t^k$ and covariance parameters $\Sigma_t^k$, where $a_t^k$ is the waypoint spatial location at time t in possible trajectory k, $\mu_t^k$ is the mean of the Normal probability distribution at time t in the trajectory prediction output for possible trajectory k, and $\Sigma_t^k$ covariance parameters for the waypoint spatial location at time t in the trajectory prediction output for possible trajectory k.

This additional term can be the same as the loss function that was used to train the agent-centric neural network.

In some of these implementations, the system only makes use of this additional term during some portions of the training. For example, the system can first perform a "warm-up" phase in which the system does not use the additional term. For example, the system can perform a threshold number of iterations of a training process, e.g., the training process 300 described below with reference to FIG. 3, without using the additional term, and then perform the remainder of the training with the additional term included. That is, the system can include the additional term in the loss function only after the scene-centric trajectory prediction neural network has already been trained on a threshold number of batches of training examples.

The system can use any of a variety of loss terms to measure the difference between student outputs and corresponding teacher outputs.

Generally, the loss terms can include a term that measures a difference between the first likelihood distribution generated by the scene-centric behavior neural network and the second likelihood distribution generated by the agent-centric trajectory prediction neural network.

As a particular example, each trajectory prediction for a given agent can include data defining a plurality of possible future trajectories for the agent and a respective likelihood score for each of the plurality of possible future trajectories.

In some of these examples, the loss terms can include a term that measures, for each agent and for each possible trajectory for the agent, a difference between the first possible future trajectory and a corresponding second possible future trajectory and a term that measures a difference between the corresponding second possible future trajectory and the probability distribution around the first possible trajectory.

For example, these loss terms can include:

$$\Sigma_{k=1}^{K} -H((\pi(x^m;\theta), \Pi(x^m;\varphi)) + \Sigma_{t=1}^{T} \log N(\xi_t^k|\mu_t^k, \Sigma_t^k; x^m;\theta),$$

where H is the cross-entropy loss, $\pi(x^m; \theta)$ is the first likelihood score for the first trajectory, $\Pi(x^m; \varphi)$ is the second likelihood score for the second trajectory, $\varphi$ are the trained values of the parameters of the second trajectory prediction neural network, $\xi^k$ is the second trajectory corresponding to the k-th first trajectory, and $\xi_t^k$ is the waypoint location at time step t in the corresponding second trajectory.

As another example, the system can sample a future trajectory using the trajectory prediction generated by the agent-centric trajectory prediction neural network and then use the sampled future trajectory for the training. The system can sample the trajectory in any of a variety of ways. For example, the system can first sample (or greedily select) one of the second possible trajectories using the second likelihood scores. The system can then select, as the sampled future trajectory, a trajectory that includes the means of the distributions at each time point within the probability distribution around the second possible trajectory. Alternative, the system can then generate the sampled future trajectory by, at each time point, sampling from the probability distribution around the second possible trajectory at that time point.

In these cases, the one or more terms can measure the log likelihood of the sampled future trajectory. For example, the terms can satisfy:

$$\Sigma_{k=1}^{k} 1(k=\hat{k}^m_{sampled})[\log \pi(x^m;\theta) + \Sigma_{t=1}^{T} \log N(\xi_{t_{sampled}}^k|\mu_t^k, \Sigma_t^k; x^m;\theta)],$$

where $1(k=\hat{k}^m_{sampled})$ is an indicator function that is 1 when the index k is the same as the index $\hat{k}^m_{sampled}$ of the most similar possible trajectory to the sampled trajectory and 0 whenever the index k is not the same as the index $\hat{k}^m_{sampled}$, $N(\xi_{t_{sampled}}^k|\mu_t^k, s_t^k; x^m; \theta)$ is the probability assigned to waypoint spatial location $\xi_{t_{sampled}}^k$ at time t in the sampled trajectory by the Normal distribution having a mean that is $\mu_t^k$ and covariance parameters $\Sigma_t^k$.

As another example, the loss terms can include a term that measures, for each agent and for each possible trajectory for the agent, a divergence between the probability distribution around the first possible future trajectory and the probability distribution around the corresponding second possible future trajectory and a term that measures, for each agent and for each possible trajectory for the agent, a difference between the likelihood score for the possible trajectory and the likelihood score for the corresponding second possible future trajectory.

For example, the terms can satisfy:

$$\Sigma_{k=1}^{K} -H((\pi(x^m;\theta), \Pi(x^m;\varphi)) + D_{KL}(N(\cdot|\mu_t^k, \Sigma_t^k; x^m;\theta)|N(\cdot|\mu_t^k, \Sigma_t^k; x^m;\varphi)),$$

where $D_{KL}$ is the KL divergence, $N(\cdot|\mu_t^k, \Sigma_t^k, x^m; \theta)$ is the probability distribution around the first possible future trajectory at time step t, and $N(\cdot|\mu_t^k; x^m; \varphi)$ is the probability distribution around the corresponding second possible future trajectory at time step t.

Figure 3:
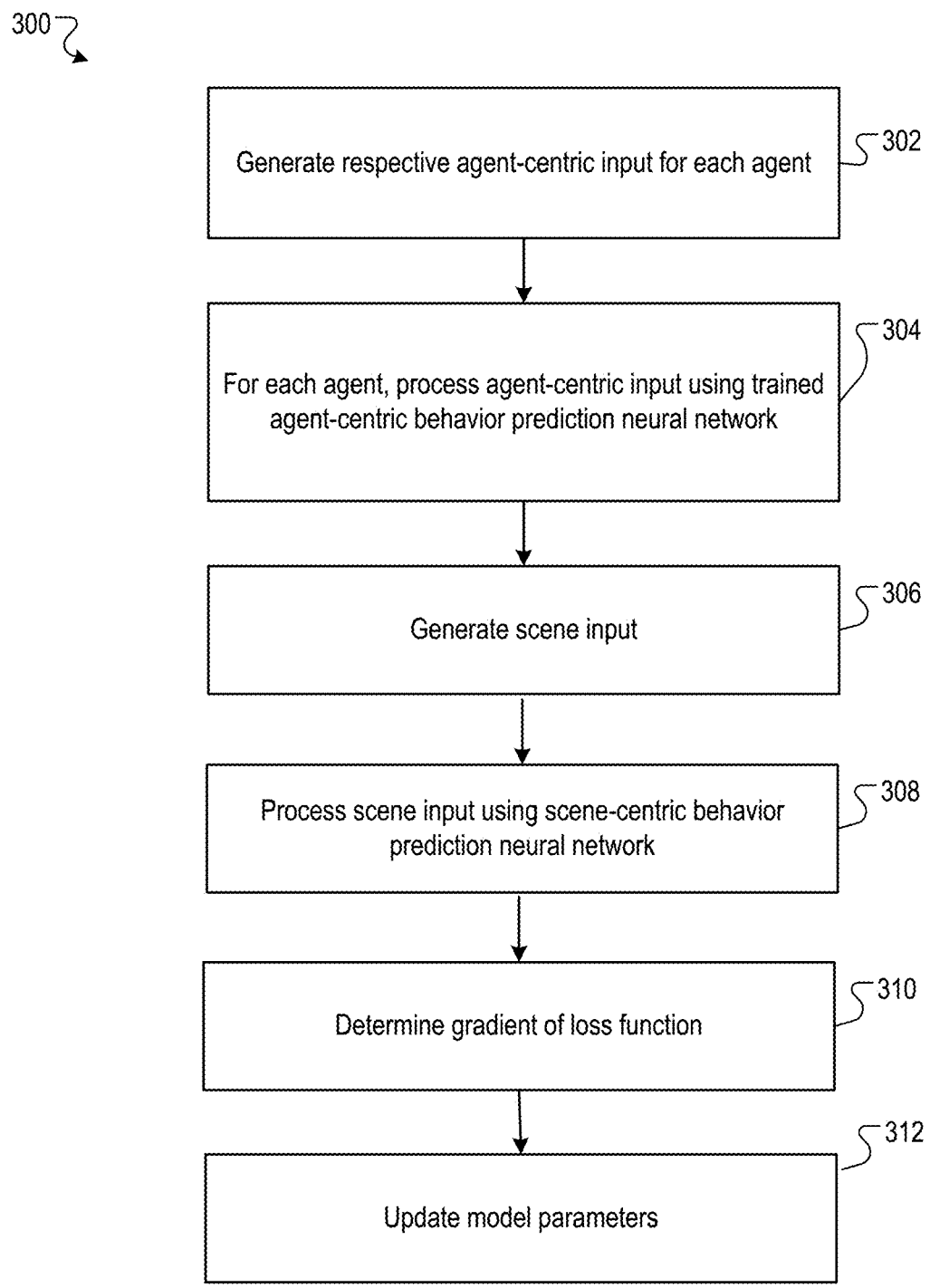
FIG. 3 is a flow diagram of an example process for training the student trajectory prediction neural network.

FIG. 3 is a flow diagram of an example process 300 for training the student trajectory prediction system. For convenience, the process 300 will be described as being performed by a system of one or more computers located in one or more locations. For example, a training system, e.g., the training system 120 of FIG. 1, appropriately programmed in accordance with this specification, can perform the process 300.

In particular, the process 300 is described with reference to training a scene-centric neural network using another, already trained agent-centric neural network. However, more generally, the process 300 can be used to train any trajectory prediction neural network using any other trajectory prediction neural network.

To perform the process 300, the system obtains a mini-batch of one or more training examples and updates the current values of the model parameters using the mini-batch.

By repeatedly updating the model parameter values in this manner for different mini-batches of training examples, the system can train the trajectory prediction neural network to generate accurate trajectory prediction outputs.

In particular, the system performs steps 302-308 for each of the training examples in the mini-batch. Each training example includes scene data characterizing a scene that includes multiple agents at a first time point. Optionally, the training example also includes a ground truth agent trajectory for each of the multiple agents that identifies the actual trajectory followed by the agent after the first time point.

The system generates, from the training example, a respective agent-centric input for each of the respective plurality of agents in the respective scene characterized by the training example (step 302). The respective agent-centric input for each agent includes features that characterize the respective scene and that are represented in an agent-specific coordinate frame that is specific to the agent, e.g., that is centered at the position of the agent at the first time point.

The system processes, for each agent in the respective scene, the agent-centric input for the agent using a trained agent-centric trajectory prediction neural network (step 304). The trained agent-centric trajectory prediction neural network has been trained to receive the agent-centric input that includes features that are represented in the agent-specific coordinate frame for the agent and to process the agent-centric input to generate a trajectory prediction for the agent.

That is, the system independently generates a respective trajectory prediction for each of the multiple agents using the trained agent-centric trajectory prediction neural network.

The system generates, from the training example, a scene input characterizing the respective scene characterized by the training example (step 306). The scene input characterizes the scene in a shared coordinate frame that is common to all of the agents in the respective scene, e.g., is centered at the position of the autonomous vehicle that generated the training example at the first time point.

The system processes the scene input using the scene-centric trajectory prediction neural network and in accordance with current values of the model parameters ("scene-centric parameters") to generate as output a respective trajectory prediction for each of the respective plurality of agents in the respective scene (step 308).

Thus, the system has now generated a scene-centric trajectory prediction and an agent-centric trajectory prediction for each of the multiple agents.

The system determines a gradient with respect to the model parameters ("scene-centric parameters") of a loss function (step 310). The system can compute the gradient, e.g., through backpropagation.

The loss function includes one or more terms that measure, for each training example and for each of the respective plurality of agents in the respective scene characterized by the training example, a difference between (i) the trajectory prediction generated for the agent by the trained agent-centric trajectory prediction neural network and (ii) the trajectory prediction generated for the agent by the scene-centric trajectory prediction neural network.

In particular, the loss function can be a combination of the distillation losses for each of the respective plurality of agents in the respective scenes characterized by the training examples in the batch. For example, the loss function can be the average of, for each training example, (i) a sum of the distillation losses for each of the agents in the scene characterized by the training example or (ii) a negative of the sum of the distillation losses for each of the agents in the scene characterized by the training example.

Examples of distillation losses for agents are described above with reference to FIG. 2.

The system updates, using the gradient, the current values of the scene-centric parameters of the scene-centric trajectory prediction neural network (step 312). In particular, the system can apply an optimizer being used for the training, e.g., the Adam optimizer, the rmsProp optimizer, or the stochastic gradient descent optimizer, to the gradient and the current values to generate updated values of the scene-centric parameters.

Although the description above describes the trajectory predictions being made on-board a vehicle after training, as another example, the trajectory predictions may be made in a computer simulation of a real-world environment being navigated through by a simulated autonomous vehicle and the target agents. Generating these predictions in simulation may assist in controlling the simulated vehicle and in testing the realism of certain situations encountered in the simulation. More generally, generating these predictions in simulation can be part of testing the control software of a real-world autonomous vehicle before the software is deployed on-board the autonomous vehicle, of training one or more machine learning models that will later be deployed on-board the autonomous vehicle or both.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, off-the-shelf or custom-made parallel processing subsystems, e.g., a GPU or another kind of special-purpose processing subsystem. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A method performed by one or more computers and for training a scene-centric trajectory prediction neural network that has a plurality of scene-centric parameters and that is configured to receive a scene input comprising features of a scene in an environment that includes a plurality of agents and to process the features in accordance with the scene-centric parameters to generate as output a respective trajectory prediction for each of the plurality of agents, the method comprising:
    obtaining a batch of one or more training examples, each training example comprising data characterizing a respective scene in the environment that includes at least a respective plurality of agents;
    for each training example in the batch:
        generating, from the training example, a respective agent-centric input for each of the respective plurality of agents in the respective scene characterized by the training example, the respective agent-centric input for each agent comprising features that characterize the respective scene and that are represented in an agent-specific coordinate frame that is specific to the agent;
        for each agent in the respective scene, processing the agent-centric input using a trained agent-centric trajectory prediction neural network, wherein the trained agent-centric trajectory prediction neural network has been trained to receive the agent-centric input that comprises features that are represented in the agent-specific coordinate frame for the agent to generate a trajectory prediction for the agent;

generating, from the training example, a scene input characterizing the respective scene characterized by the training example in a shared coordinate frame that is common to all of the agents in the respective scene; and processing the scene input using the scene-centric trajectory prediction neural network and in accordance with current values of the scene-centric parameters to generate as output a respective trajectory prediction for each of the respective plurality of agents in the respective scene;

determining a gradient with respect to the scene-centric parameters of a loss function that includes one or more terms that measure, for each training example and for each of the respective plurality of agents in the respective scene characterized by the training example, a difference between (i) the trajectory prediction generated for the agent by the trained agent-centric trajectory prediction neural network and (ii) the trajectory prediction generated for the agent by the scene-centric trajectory prediction neural network; and updating, using the gradient, the current values of the scene-centric parameters of the scene-centric trajectory prediction neural network.

2. The method of claim 1, wherein each training example further comprises a respective ground truth observed trajectory for one or more of the respective plurality of agents in the respective scene characterized by the training example, and wherein the loss function further comprises an additional term that measures, for each training example and for each of the one or more agents for which a respective ground truth observed trajectory is included in the training example, a difference between (i) the respective ground truth observed trajectory for the agent and (ii) the trajectory prediction generated for the agent by the scene-centric trajectory prediction neural network.

3. The method of claim 2, wherein the additional term is only included in the loss function after the scene-centric trajectory prediction neural network has already been trained on a threshold number of batches of training examples.

4. The method of claim 1, wherein, for each of the respective plurality of agents in each of the training examples:
(i) the trajectory prediction generated for the agent by the trained agent-centric trajectory prediction neural network defines a second likelihood distribution over possible future trajectories for the agent and (ii) the trajectory prediction generated for the agent by the scene-centric trajectory prediction neural network defines a first likelihood distribution over possible future trajectories, and
wherein the one or more terms measure a difference between the first likelihood distribution and the second likelihood distribution.

5. The method of claim 4, wherein, for each of the respective plurality of agents in each of the training examples:
(i) the trajectory prediction generated for the agent by the trained agent-centric trajectory prediction neural network includes data defining a plurality of second possible future trajectories and a respective second score for each of the plurality of second possible future trajectories, and (ii) the trajectory prediction generated for the agent by the scene-centric trajectory prediction neural network includes data defining a plurality of first possible future trajectories and a respective first score for each of the plurality of first possible future trajectories.

6. The method of claim 5, wherein the one or more terms include, for each of the first possible future trajectories:
a first term that measures a difference between the first score for the first possible future trajectory and a second score for a corresponding second possible future trajectory.

7. The method of claim 5, wherein:
for each first possible future trajectory, the data defining the first possible future trajectory are parameters of a probability distribution around the first possible future trajectory, and
for each second possible future trajectory, the data defining the second possible future trajectory are parameters of a probability distribution around the second possible future trajectory.

8. The method of claim 7, wherein the one or more terms include, for each of the first possible future trajectories:
a third term that measures a likelihood assigned to a corresponding second possible future trajectory by the probability distribution around the first possible future trajectory.

9. The method of claim 7, wherein the one or more terms include, for each of the first possible future trajectories:
a fourth term that measures a divergence between the probability distribution around the first possible future trajectory and the probability distribution around a corresponding second possible future trajectory.

10. The method of claim 7, wherein the one or more terms include:
(i) a fifth term that measures a first score assigned to a first possible future trajectory that is closest to a possible future trajectory that has been sampled using the trajectory prediction generated for the agent by the trained agent-centric trajectory prediction neural network.

11. The method of claim 10, wherein the one or more terms include
(ii) a sixth term that measures a likelihood assigned to the sampled possible future trajectory by the probability distribution around the second possible future trajectory that is closest to the sampled possible future trajectory.

12. A system comprising one or more computers and one or more storage devices storing instructions that when executed by the one or more computers cause the one or more computers to perform operations for training a scene-centric trajectory prediction neural network that has a plurality of scene-centric parameters and that is configured to receive a scene input comprising features of a scene in an environment that includes a plurality of agents and to process the features in accordance with the scene-centric parameters to generate as output a respective trajectory prediction for each of the plurality of agents, the operations comprising:
obtaining a batch of one or more training examples, each training example comprising data characterizing a respective scene in the environment that includes at least a respective plurality of agents;
for each training example in the batch:
generating, from the training example, a respective agent-centric input for each of the respective plurality of agents in the respective scene characterized by the training example, the respective agent-centric input for each agent comprising features that characterize the respective scene and that are represented in an agent-specific coordinate frame that is specific to the agent;

for each agent in the respective scene, processing the agent-centric input using a trained agent-centric trajectory prediction neural network, wherein the trained agent-centric trajectory prediction neural network has been trained to receive the agent-centric input that comprises features that are represented in the agent-specific coordinate frame for the agent to generate a trajectory prediction for the agent;

generating, from the training example, a scene input characterizing the respective scene characterized by the training example in a shared coordinate frame that is common to all of the agents in the respective scene; and processing the scene input using the scene-centric trajectory prediction neural network and in accordance with current values of the scene-centric parameters to generate as output a respective trajectory prediction for each of the respective plurality of agents in the respective scene;

determining a gradient with respect to the scene-centric parameters of a loss function that includes one or more terms that measure, for each training example and for each of the respective plurality of agents in the respective scene characterized by the training example, a difference between (i) the trajectory prediction generated for the agent by the trained agent-centric trajectory prediction neural network and (ii) the trajectory prediction generated for the agent by the scene-centric trajectory prediction neural network; and updating, using the gradient, the current values of the scene-centric parameters of the scene-centric trajectory prediction neural network.

13. The system of claim 12, wherein each training example further comprises a respective ground truth observed trajectory for one or more of the respective plurality of agents in the respective scene characterized by the training example, and wherein the loss function further comprises an additional term that measures, for each training example and for each of the one or more agents for which a respective ground truth observed trajectory is included in the training example, a difference between (i) the respective ground truth observed trajectory for the agent and (ii) the trajectory prediction generated for the agent by the scene-centric trajectory prediction neural network.

14. The system of claim 13, wherein the additional term is only included in the loss function after the scene-centric trajectory prediction neural network has already been trained on a threshold number of batches of training examples.

15. The system of claim 12, wherein, for each of the respective plurality of agents in each of the training examples:

(i) the trajectory prediction generated for the agent by the trained agent-centric trajectory prediction neural network defines a second likelihood distribution over possible future trajectories for the agent and (ii) the trajectory prediction generated for the agent by the scene-centric trajectory prediction neural network defines a first likelihood distribution over possible future trajectories, and wherein the one or more terms measure a difference between the first likelihood distribution and the second likelihood distribution.

16. The system of claim 15, wherein, for each of the respective plurality of agents in each of the training examples:

(i) the trajectory prediction generated for the agent by the trained agent-centric trajectory prediction neural network includes data defining a plurality of second possible future trajectories and a respective second score for each of the plurality of second possible future trajectories, and (ii) the trajectory prediction generated for the agent by the scene-centric trajectory prediction neural network includes data defining a plurality of first possible future trajectories and a respective first score for each of the plurality of first possible future trajectories.

17. The system of claim 16, wherein the one or more terms include, for each of the first possible future trajectories:

a first term that measures a difference between the first score for the first possible future trajectory and a second score for a corresponding second possible future trajectory.

18. The system of claim 16, wherein:

for each first possible future trajectory, the data defining the first possible future trajectory are parameters of a probability distribution around the first possible future trajectory, and for each second possible future trajectory, the data defining the second possible future trajectory are parameters of a probability distribution around the second possible future trajectory.

19. The system of claim 18, wherein the one or more terms include, for each of the first possible future trajectories:

a third term that measures a likelihood assigned to a corresponding second possible future trajectory by the probability distribution around the first possible future trajectory.

20. One or more non-transitory computer-readable storage media storing instructions that when executed by one or more computers cause the one or more computers to perform operations for training a scene-centric trajectory prediction neural network that has a plurality of scene-centric parameters and that is configured to receive a scene input comprising features of a scene in an environment that includes a plurality of agents and to process the features in accordance with the scene-centric parameters to generate as output a respective trajectory prediction for each of the plurality of agents, the operations comprising:

obtaining a batch of one or more training examples, each training example comprising data characterizing a respective scene in the environment that includes at least a respective plurality of agents;

for each training example in the batch:
generating, from the training example, a respective agent-centric input for each of the respective plurality of agents in the respective scene characterized by the training example, the respective agent-centric input for each agent comprising features that characterize the respective scene and that are represented in an agent-specific coordinate frame that is specific to the agent;

for each agent in the respective scene, processing the agent-centric input using a trained agent-centric trajectory prediction neural network, wherein the trained agent-centric trajectory prediction neural network has been trained to receive the agent-centric input that comprises features that are represented in the agent-specific coordinate frame for the agent to generate a trajectory prediction for the agent;

generating, from the training example, a scene input characterizing the respective scene characterized by the training example in a shared coordinate frame that is common to all of the agents in the respective scene; and processing the scene input using the scene-centric trajectory prediction neural network and in accordance with current values of the scene-centric parameters to generate as output a respective trajectory prediction for each of the respective plurality of agents in the respective scene;

determining a gradient with respect to the scene-centric parameters of a loss function that includes one or more terms that measure, for each training example and for each of the respective plurality of agents in the respective scene characterized by the training example, a difference between (i) the trajectory prediction generated for the agent by the trained agent-centric trajectory prediction neural network and (ii) the trajectory prediction generated for the agent by the scene-centric trajectory prediction neural network; and updating, using the gradient, the current values of the scene-centric parameters of the scene-centric trajectory prediction neural network.

* * * * *